UNITED STATES PATENT OFFICE.

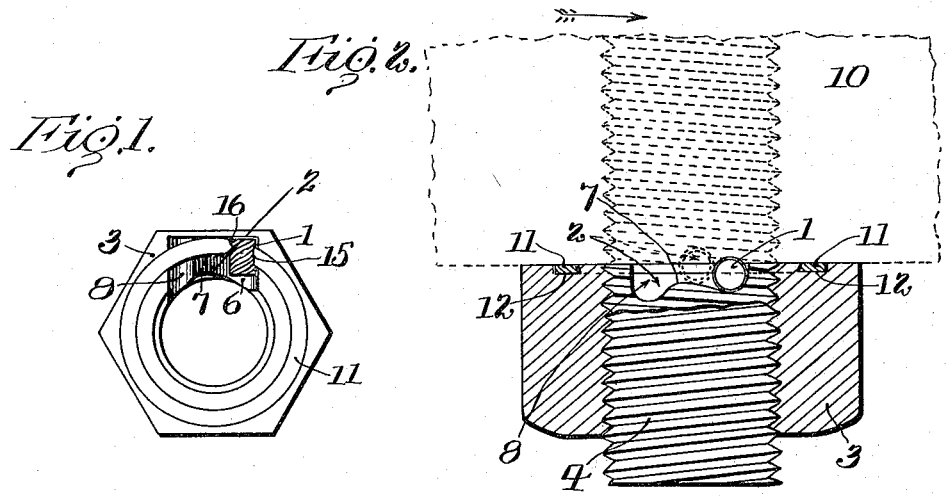
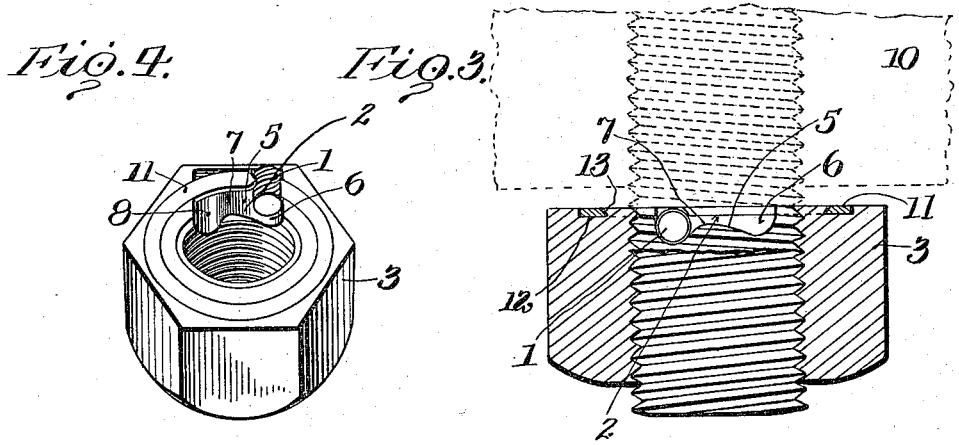
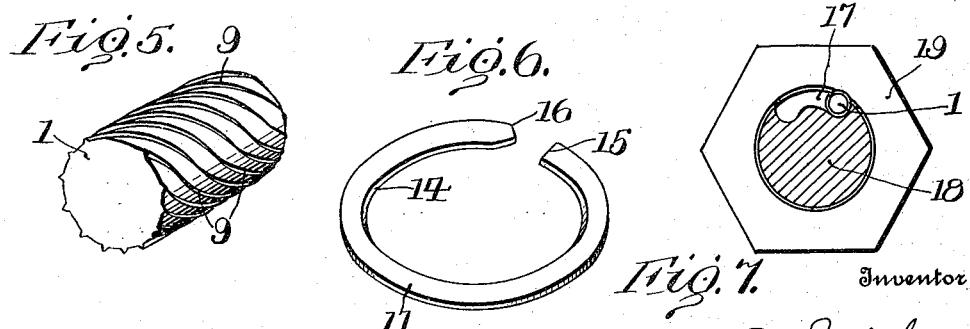

ALBERT E. SMITH, OF DUNKIRK, NEW YORK.

NUT-LOCK.

1,155,844. Specification of Letters Patent. Patented Oct. 5, 1915.

Application filed December 12, 1914. Serial No. 876,834.

*To all whom it may concern:*

Be it known that I, ALBERT E. SMITH, a citizen of the United States, residing at Dunkirk, in the county of Chautauqua, State of New York, have invented certain new and useful Improvements in Nut-Locks, of which the following is a description, reference being had to the accompanying drawing and to the figures of reference marked thereon.

The invention relates to new and useful improvements in nut locks wherein the nut is locked from turning relative to the bolt on which it is threaded.

An object of the invention is to provide a nut lock having a gripping roller which is brought into action when force is applied to turn the nut from the bolt, which gripping roller is provided with gripping means adapted to engage and bite the part with which it co-acts at any point of rest.

A further object of the invention is to provide a device of the above character with means whereby excessive force may be used to release the nut lock.

These and other objects will in part be obvious and will in part be hereinafter more fully described.

Figure 1 is a bottom plan view of a nut having my improved locking means applied thereto. Fig. 2 is a longitudinal sectional view through the nut showing the same applied to a bolt and in dotted lines the part against which the nut is locked. Fig. 3 is a view similar to Fig. 2 showing the nut locking means released by force. Fig. 4 is a perspective view of a nut having my improved locking means applied thereto. Fig. 5 is an enlarged detail in perspective of the gripping roller. Fig. 6 is an enlarged detail in perspective of the retaining clip. Fig. 7 is a sectional view showing a modified form of the invention.

The invention is directed primarily to a nut lock in which the active gripping element is a roller. This roller co-acts with a part relative to which it is desired to prevent the nut from turning and the roller is caused to grip the said part. In order that the roller, while in any position, may at once bite the part which is to be gripped, said roller is provided with a helical gripping lip or a plurality of helical gripping lips. Inasmuch as these gripping lips extend in a helical path about the cylindrical surface of the roller no matter what may be the position of the roller it will be in proper gripping contact with the part with which it co-acts. In the preferable embodiment of the invention the nut is provided with a recess on its under face for this gripping roller and said recess has an inclined face which causes the roller to grip the part with which it co-acts when any force is applied which tends to turn the nut from the bolt. Said inclined surface preferably terminates in an enlarged portion of the recess so that when excessive or great pressure is applied to the nut said gripping roller may be forced over the inclined shoulder into the enlarged recess and thus releases the nut.

Referring more in detail to the drawings, my improved nut lock shown in Figs. 1 to 6 includes a gripping roller 1 which is adapted to seat in a recess 2 formed in a nut 3. This recess 2 preferably extends from the inner wall of the nut to a point adjacent the outer wall but is not cut through as is clearly shown in Figs. 1 and 4. This prevents the roller from being dislodged from the recess during the applying of the nut to the bolt. The nut is threaded as is usual and is adapted to engage a threaded bolt 4. The recess 2 has an inclined surface 5 which extends from the enlarged portion 6 outwardly so as to form a shoulder 7, said recess also has an enlarged portion 8 at the other end thereof. The roller 1 as more clearly shown in Fig. 5 is provided with gripping lips 9, 9. These gripping lips extend in a helical path about the cylindrical surface of the roller and are parallel with each other, said gripping lips will be spaced according to the desired number of gripping lips which, of course, may be varied. When the roller is in place in the nut as shown in Fig. 2 the turning of the nut in the direction indicated by the arrow threads the nut on the bolt and this turning movement of the nut causes the roller 1 to move on the nut in the recess 2 into the enlarged pocket 6. This permits the turning of the nut 3 against the part 10 which is to be clamped by the bolt and nut. When the nut is in gripping contact with the part 10 the roller also lightly grips said part. Any tendency on the part of the nut to turn off from the bolt which, of course, is held from turning relative to the part 10, will cause the roller 1 to run up the incline 5 and grip the part 10 so as to prevent turning of the nut. As above noted the gripping lips extend in a helical path about the circumference of the cylindrical surface of the gripping roller 1, and, therefore, no matter what position said roller may rest in, it will at once grip into part 10 and prevent the nut from turning on the bolt.

I am aware that it is old to provide a gripping roller which is hexagonal in cross section thus forming gripping lips extending parallel to the axis of the roller, such a cross sectional structure has flat faces and it is found in practice that a flat face will engage the co-acting surface and the gripping lips will not turn so as to grip into said surface. By my improved arrangement of the gripping lips where the same extends in a helical path about the cylindrical surface of the roller there is no flat surface whatever which can engage co-acting parts but on the contrary the gripping lips are at all times in engagement with said parts and ready to bite into the same. As clearly shown in Figs. 2 and 3, if excessive force be applied to the nut, as the use of a wrench or the like, said roller may be forced over the shoulder 7 into the enlarged pocket 8 which is even larger than the pocket 6 and allows the roller to entirely release the part which is gripped and thus permits the nut to be turned from the bolt. I have also provided means for holding the gripping roller in the recess to facilitate the handling of the nut and the threading of the same on the bolt. As herein shown said means consists of a retaining clip 11. Said nut has an annular recess 12 formed therein, one face of which is under cut as at 13, said retaining clip has a beveled edge 14 which engages said under-cut portion 13. This holds the retaining clip 11 in the recess 12 but permits free endwise movement on the same. Said clip is in the form of an annulus with a section cut out providing spaced ends 15 and 16. The space between the ends 15 and 16 is slightly less than the diameter of the roller 1. This clip holds the roller in the recess but as the clip is free to move endwise it permits the roller to climb the incline and to move over into the enlarged pocket 8.

In Fig. 7 I have shown a slightly modified form of the invention wherein the recess 17 for the roller 1 is formed in the body of the bolt 18 and is adapted to engage the inner threaded wall of the nut 19, said roller may be inserted after the nut is threaded on the bolt and will serve to lock the bolt and nut together in the manner above described.

It is obvious that minor changes in the details of construction may be made without departing from the spirit of the invention as set forth in the appended claims.

Having thus described my invention what I claim as new and desire to secure by Letters Patent is:

1. The combination of a threaded nut, a threaded bolt, and a nut lock therefor, including a roller housed in a recess in one of said parts and adapted to prevent the nut from turning relative to the bolt, said roller having a helical biting lip formed thereon.

2. The combination of a threaded nut, a threaded bolt and a nut lock therefor, including a roller housed in a recess formed in the inner face of the nut, said recess having an inclined inner wall on which said roller is adapted to rest, said roller having a plurality of parallel gripping lips extending in a helical path about the cylindrical surface of said roller.

3. The combination of a threaded nut, a threaded bolt and a nut lock therefor, including a roller housed in a recess formed in the inner face of the nut, said recess having an inclined inner wall on which said roller is adapted to rest, said roller having a plurality of parallel gripping lips extending in a helical path about the cylindrical surface of said roller, said recess for the roller in said inclined inner face having an enlarged pocket adapted to receive said gripping roller when the same is forced over the shoulder formed by said inclined surface.

4. The combination of a threaded nut, a threaded bolt and a nut lock therefor, including a roller housed in a recess formed in the inner face of the nut, said recess having an inclined inner wall on which said roller is adapted to rest, said roller having a plurality of parallel gripping lips extending in a helical path about the cylindrical surface of said roller, and means for retaining said gripping roller in said recess, said means being so constructed as to permit the roller to freely move along the inclined surface of said recess.

5. The combination of a threaded nut, a threaded bolt and a nut lock therefor, including a roller housed in a recess formed in the inner face of the nut, said recess having an inclined inner wall on which said roller is adapted to rest, said roller having a plurality of parallel gripping lips extending in a helical path about the cylindrical surface of said roller, said nut having an annular groove formed in the inner face thereof, a retaining clip located in said groove and adapted to move endwise therein, said clip serving to hold said gripping roller in said recess.

In testimony whereof, I affix my signature, in the presence of two witnesses.

ALBERT E. SMITH.

Witnesses:
MADELINE TUCKER,
ROLLIN W. SNOW.

Copies of this patent may be obtained for five cents each, by addressing the "Commissioner of Patents, Washington, D. C."